(12) United States Patent
Chiu et al.

(10) Patent No.: US 11,137,836 B2
(45) Date of Patent: Oct. 5, 2021

(54) ELECTRONIC DEVICE

(71) Applicant: ASUSTeK COMPUTER INC., Taipei (TW)

(72) Inventors: Pin-Tang Chiu, Taipei (TW); Yung-Shen Hsu, Taipei (TW); Ping-Chang Huang, Taipei (TW); Ling Tien, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/585,493

(22) Filed: Sep. 27, 2019

(65) Prior Publication Data

US 2020/0117289 A1 Apr. 16, 2020

(30) Foreign Application Priority Data

Oct. 12, 2018 (CN) .......................... 201811187491.X

(51) Int. Cl.
| | | |
|---|---|---|
| *G06F 3/0354* | (2013.01) | |
| *G06F 3/039* | (2013.01) | |
| *G06F 3/041* | (2006.01) | |
| *G06F 3/0485* | (2013.01) | |
| *G06F 3/0488* | (2013.01) | |

(52) U.S. Cl.
CPC ........ *G06F 3/03543* (2013.01); *G06F 3/0393* (2019.05); *G06F 3/03547* (2013.01); *G06F 3/0416* (2013.01); *G06F 3/0485* (2013.01); *G06F 3/0488* (2013.01)

(58) Field of Classification Search
CPC ...... G06F 3/0488; G06F 3/0393; G06F 1/169; G06F 3/0416; G06F 3/0485; G06F 3/03547; G06F 3/03543
See application file for complete search history.

(56) References Cited

U.S. PATENT DOCUMENTS

| | | | |
|---|---|---|---|
| 5,126,955 A | 6/1992 | Tomoda | |
| 8,072,423 B2 | 12/2011 | Rolus Borgward | |
| 8,917,235 B2* | 12/2014 | Orsley | ................. G06F 1/1616 |
| | | | 345/156 |
| 2006/0152484 A1* | 7/2006 | Rolus Borgward | ........................ |
| | | | G06F 3/03543 |
| | | | 345/157 |
| 2007/0109272 A1* | 5/2007 | Orsley | ................. G06F 1/1632 |
| | | | 345/173 |
| 2018/0374448 A1* | 12/2018 | Jeong | .................... G06F 1/1632 |

FOREIGN PATENT DOCUMENTS

| | | |
|---|---|---|
| CN | 1412665 A | 4/2003 |
| CN | 1849575 A | 10/2006 |
| CN | 201532617 U | 7/2010 |
| CN | 102012756 A | 4/2011 |
| JP | 2-210523 A | 8/1990 |

* cited by examiner

*Primary Examiner* — Vinh T Lam
(74) *Attorney, Agent, or Firm* — McClure, Qualey & Rodack, LLP

(57) ABSTRACT

The disclosure provides an electronic device, including a body and a mouse body. The body includes an accommodating area. The mouse body includes a touch surface and is detachably disposed in the accommodating area.

7 Claims, 10 Drawing Sheets

ELECTRONIC DEVICE

CROSS-REFERENCE TO RELATED APPLICATION

This application claims the priority benefit of China Application Serial No. 201811187491.X, filed on Oct. 12, 2018. The entirety of the above-mentioned patent application is hereby incorporated by reference herein and made a part of specification

BACKGROUND OF THE INVENTION

Field of the Invention

The disclosure relates to an electronic device and, more particularly, to a portable electronic device.

Description of the Related Art

For electronic devices such as notebook computers, a touch pad are usually configured as input interfaces of the electronic device to replace a mouse. In addition, two buttons located on the left and on the right of the touch pad are collocated to replace a left key and a right key on the mouse to trigger corresponding functions (for example, an icon is clicked or a menu is opened by pressing the left button on the touch pad).

However, in order to reduce the overall structural space of the touch pad to facilitate lower dimension of the electronic device, usually, the touch pad is only a flat plate body. Therefore, the touch pad cannot provide a user with the same hand feeling as the mouse does. Most users still bring a mouse together to work with a computer which is inconvenient.

BRIEF SUMMARY OF THE INVENTION

According to the first aspect of the disclosure, an electronic device is provided. The electronic device includes a body and a mouse body. The body comprises an accommodating area. The mouse body is detachably disposed in the accommodating area and comprising a touch surface.

The detailed descriptions of other effects and embodiments of the disclosure are provided below with reference to the accompanying drawings.

BRIEF DESCRIPTION OF THE DRAWINGS

To more clearly describe the technical solutions in the embodiments of this application or in the prior art, the following will briefly introduce the drawings required for describing the embodiments or the prior art. It is apparent that the drawings in the following description are only some embodiments described in this application, and a person of ordinary skill in the art may obtain other drawings on the basis of these drawings without any creative effort.

DETAILED DESCRIPTION OF THE EMBODIMENTS

Figure 1:
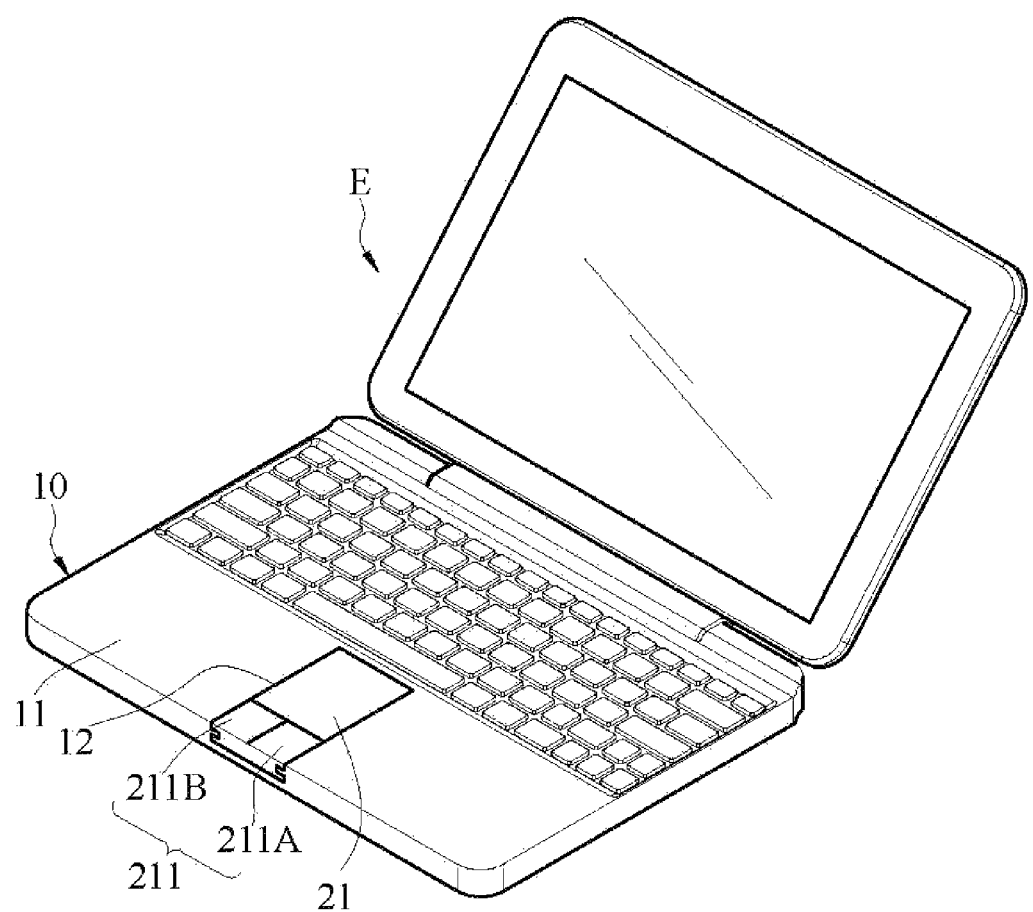
FIG. 1 is a schematic diagram showing an embodiment of an electronic device of the disclosure.
Figure 2:
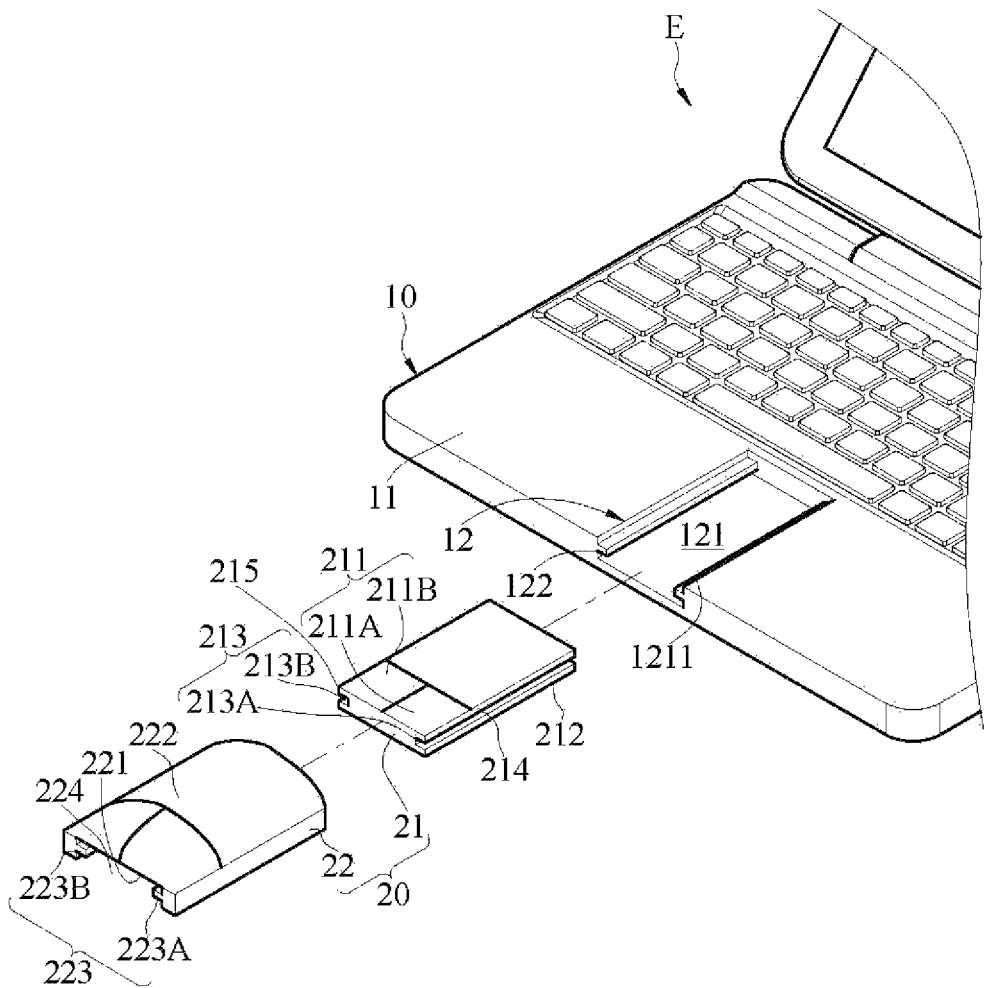
FIG. 2 is a schematic exploded view showing use of a mouse body in combination with an auxiliary member in an embodiment of the electronic device in FIG. 1.

Refer to FIG. 1 and FIG. 2. FIG. 1 is a schematic diagram showing an embodiment according to an electronic device E of the disclosure. The electronic device E is, but not limited to, a notebook computer. A mouse 20 is provided for a user to control the electronic device E.

Refer to FIG. 2. The electronic device E shown in FIG. 2 includes a body 10 and a mouse body 21. The body 10 includes an accommodating area 12. The mouse body 21 has a touch surface 211 and is detachably disposed in the accommodating area 12 of the body 10.

Figure 3:
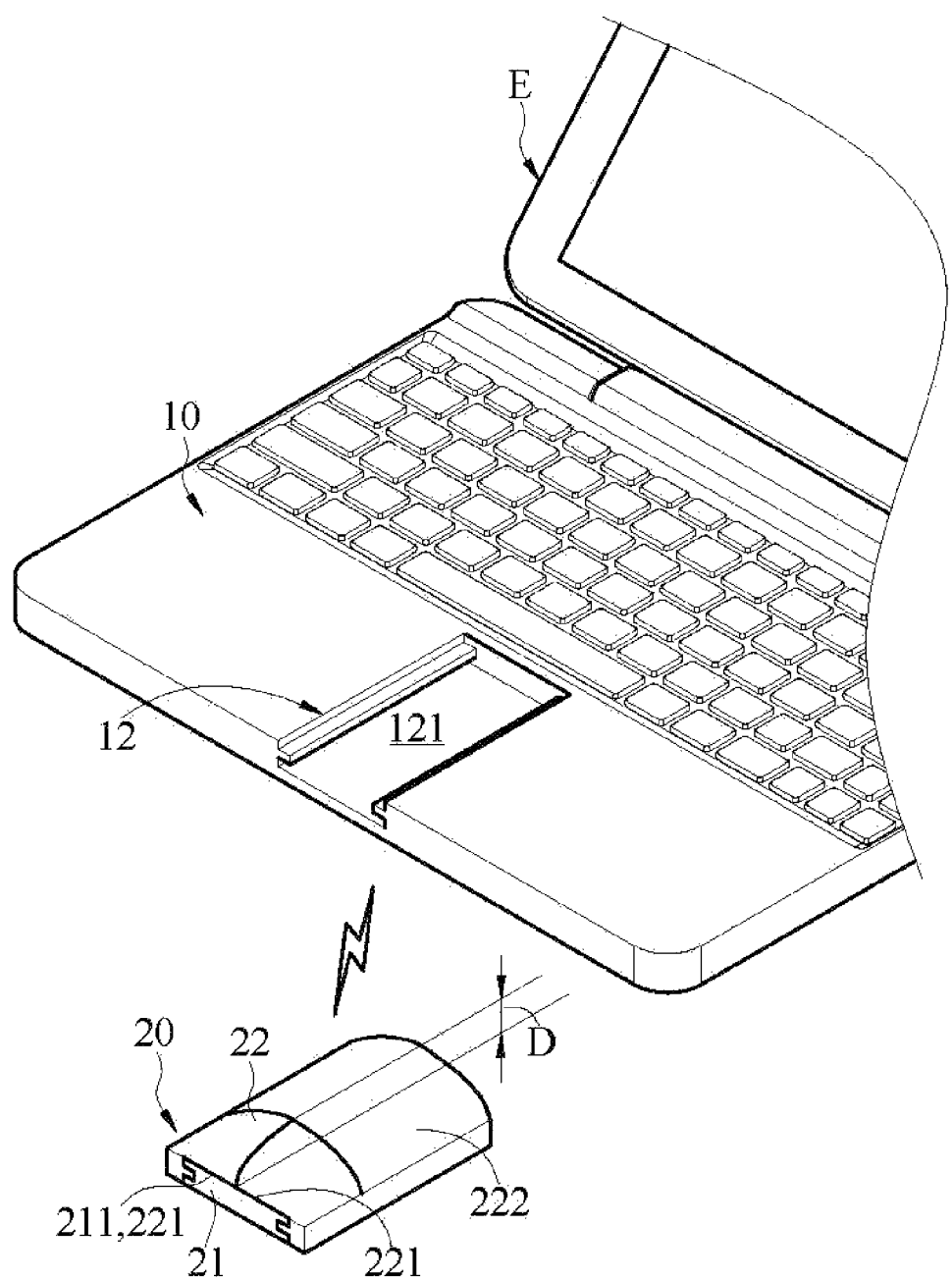
FIG. 3 is a schematic diagram showing a state in which a mouse is detached from the body for use in an embodiment of the electronic device in the disclosure.

Refer to FIG. 1 and FIG. 2. In an embodiment, the mouse body 21 and at least one auxiliary member 22 constitute the mouse 20 for use. In the embodiment, the auxiliary member 22 is detachably disposed in the accommodating area 12 and is combined with the mouse body 21. In addition, the auxiliary member 22 has an inner surface 221. The inner surface 221 of the auxiliary member 22 is or is not superimposed on the touch surface 211 of the mouse body 21. Refer to FIG. 3. The inner surface 221 of the auxiliary member 22 superimposed on the touch surface 211 of the mouse body 21 and thus constitutes the mouse 20. The auxiliary member 22 is for the user to easily hold the mouse 20 and controls the touch surface 211 thereby. The configuration of the auxiliary member 22 is used to provide the user a good physical hand feeling of grasping. Refer to FIG. 2. When the inner surface 221 of the auxiliary member 22 is not superimposed on the touch surface 211 of the mouse body 21, the auxiliary member 22 is respectively received or accommodated in the accommodating area 12.

Refer to FIG. 1 and FIG. 2. In an embodiment, the body 10 is, but is not limited to, a part of a host of the notebook computer. The body 10 further includes an operation surface 11. The accommodating area 12 is disposed on the operation surface 11. Further, in an embodiment, a keyboard module is disposed on the operation surface 11. Specifically, the accommodating area 12 includes a groove 121, the groove 121 has a notch 1211, and the notch 1211 is formed on the operation surface 11. In other words, the groove 121 is a recess on the operation surface 11.

Likewise, refer to FIG. 2 and FIG. 3. In an embodiment, the mouse body 21 is a touch pad like structure including the touch surface 211 and a sensing surface 212. The touch surface 211 and the sensing surface 212 are formed at opposite positions. Specifically, the touch surface 211 is for the user to touch and control, and the sensing surface 212 is, but not limited to, provided with an optical sensor, a laser sensor, or a blue light sensor to sense a location and an action of the mouse body 21.

Refer to FIG. 1 and FIG. 2. In the embodiment, the mouse body 21 has an outer contour. A shape of the outer contour of the mouse body 21 corresponds to a shape of the groove 121. The mouse body 21 is accommodated in the groove 121 of the body 10. When the mouse body 21 is accommodated in the groove 121, the touch surface 211 of the mouse body 21 and the operation surface 11 of the body 10 are coplanar.

Specifically, the mouse body 21 is, but not limited to, a resistive or capacitive touch pad structure. In an embodiment, the mouse body 21 is a capacitive touch pad structure. When the user touches the touch surface 211, a capacitance is changed in the touch surface 211 and thereby a movement of an indication cursor generates when the electronic device E operates.

In an embodiment, the mouse body 21 is a resistive touch pad structure, where a first resistance film and a second resistance film are disposed in the mouse body 21. The first resistance film is adjacent to the touch surface 211 and having a deformation capability. The second resistance film is fixed in the mouse body 21 and keeps a distance from the first resistance film. Thereby, when the user touches the touch surface 211, touch pressure from the user is imposed on the first resistance film through the touch surface 211, the first resistance film deforms to contact the second resistance film, and the second resistance film senses a location of pressure imposed by the user, so as to control the movement of the indication cursor when the electronic device E operates.

Continue to refer to FIG. 2 and FIG. 3. In an embodiment, the auxiliary member 22 is a single mechanical body and includes the inner surface 221 and an outer surface 222 opposite to each other. A depth D exists between the inner surface 221 and the outer surface 222 of the auxiliary member 22. The inner surface 221 of the auxiliary member 22 is used to contact the touch surface 211 of the mouse body 21 for control. The outer surface 222 helps the user to grasp by hand easily.

Further, in order to improve comfort of grasping the mouse 20 by a hand of the user, the outer surface 222 of the auxiliary member 22 is a curved surface which conforming to ergonomic design. Specifically, a shape of the outer surface 222 of the auxiliary member 22 is corresponding to a shape formed by grasping the mouse 20 by arching a human palm.

Further, refer to FIG. 2. In another embodiment, the mouse body 21 is detachably combined with at least one auxiliary member 22.

When the inner surface 221 of the auxiliary member 22 is not superimposed on the touch surface 211 of the mouse body 21, the auxiliary member 22 is completely detached from the mouse body 21. In the embodiment, the mouse body 21 has a combination portion 213, the auxiliary member 22 has an engagement portion 223 corresponding to the combination portion 213, and the engagement portion 223 of the auxiliary member 22 is detachably combined with the combination portion 213.

Continue to refer to FIG. 2. Specifically, the mouse body 21 has the outer contour, the outer contour includes a first side 214 and a second side 215 opposite to each other, and the first side 214 and the second side 215 are respectively connected between the touch surface 211 and the sensing surface 212. The combination portion 213 includes a first combination portion 213A and a second combination portion 213B, the first combination portion 213A is disposed on the first side 214 of the mouse body 21, and the second combination portion 213B is disposed on the second side 215. In addition, the engagement portion 223 includes a first engagement portion 223A and a second engagement portion 223B. The first engagement portion 223A configured to combine the first combination portion 213A and the second engagement portion 223B configured to combine with the second combination portion 213B are disposed on the auxiliary member 22. Thereby, the auxiliary member 22 is combined with the mouse body 21 by combining the first combination portion 213A and the first engagement portion 223A and combining the second combination portion 213B and the second engagement portion 223B.

Specifically, refer to FIG. 2 and FIG. 3. In an embodiment, the first combination portion 213A of the mouse body 21 is a sliding groove extending through two corresponding ends of the first side 214 and the second combination portion 213B is a sliding groove extending through two corresponding ends of the second side 215. The auxiliary member 22 has a housing groove 224. A shape of the housing groove 224 corresponds to an appearance shape of the mouse body 21. The first engagement portion 223A and the second engagement portion 223B are disposed in two corresponding inner sides of the housing groove 224. The first engagement portion 223A is a bump slidably accommodated in the first combination portion 213A. The second engagement portion 223B is a bump slidably accommodated in the second combination portion 213B. The bumps are detachably combined with the sliding groove.

Since the first engagement portion 223A is slidably accommodated in the first combination portion 213A and the second engagement portion 223B is slidably accommodated in the second combination portion 213B, the auxiliary member 22 is detachably combined with the mouse body 21 in a slidable coating manner. In this way, the auxiliary member 22 is assembled on the mouse body 21 for use based on a use requirement.

Refer to FIG. 2 and FIG. 3. When the inner surface 221 of the auxiliary member 22 is superimposed on the touch surface 211 of the mouse body 21, the housing groove 224 of the auxiliary member 22 covers the touch surface 211, the first side 214, and the second side 215 of the mouse body 21. The sensing surface 212 is exposed in the auxiliary member 22 for sensing. The user can grasp the outer surface 222 of the auxiliary member 22 with a palm to operate and control the mouse body 21. The sensing surface 212 exposed in the auxiliary member 22 senses a location at which the mouse body 21 locates and, the auxiliary member 22 imposes pressure on the touch surface 211 for control when the user presses the auxiliary member 22.

In addition, in an embodiment, the auxiliary member 22 is detachably combined with the mouse body 21. The auxiliary member 22 is designed into different sizes or into different shapes for left and right palms, allowing different users to use different auxiliary members 22 as required.

Further, continue to refer to FIG. 1 and FIG. 2. In an embodiment, the auxiliary member 22 is slidably detached from the mouse body 21, and the mouse body 21 is also slidably combined with the accommodating area 12 of the body 10. The accommodating area 12 further includes a guiding portion 122. The guiding portion 122 is disposed in the groove 121. In an embodiment, the guiding portion 122 is a bump correspondingly accommodated in the combination portion 213 of the mouse body 21. In the embodiment, the groove 121 is connected to the operation surface 11 and the notch 1211 of the groove 121 further extends to a side surface of the adjacent operation surface 11. In the embodiment, the guiding portion 122 extends to the notch 1211 on the side surface of the adjacent operation surface 11. In this way, the mouse body 21 is inserted into the groove 121 of the body 10 from the notch 1211 on the adjacent operation surface 11 and is slidably accommodated in the groove 121 by the combination of the combination portion 213 and the guiding portion 122. In this way, the mouse body 21 is combined with the accommodating area 12 of the body 10 in a slidable manner.

Refer to FIG. 1 and FIG. 2. In an embodiment, the guiding portion 122 of the accommodating area 12 is a structure that similar to the engagement portion 223 of the auxiliary member 22. In this way, the combination portion 213 of the mouse body 21 is configured to combine with the accommodating area 12 of the body 10 or the engagement portion 223 of the auxiliary member 22. Therefore, structure complexity of the mouse body 21 is reduced.

Figure 4:
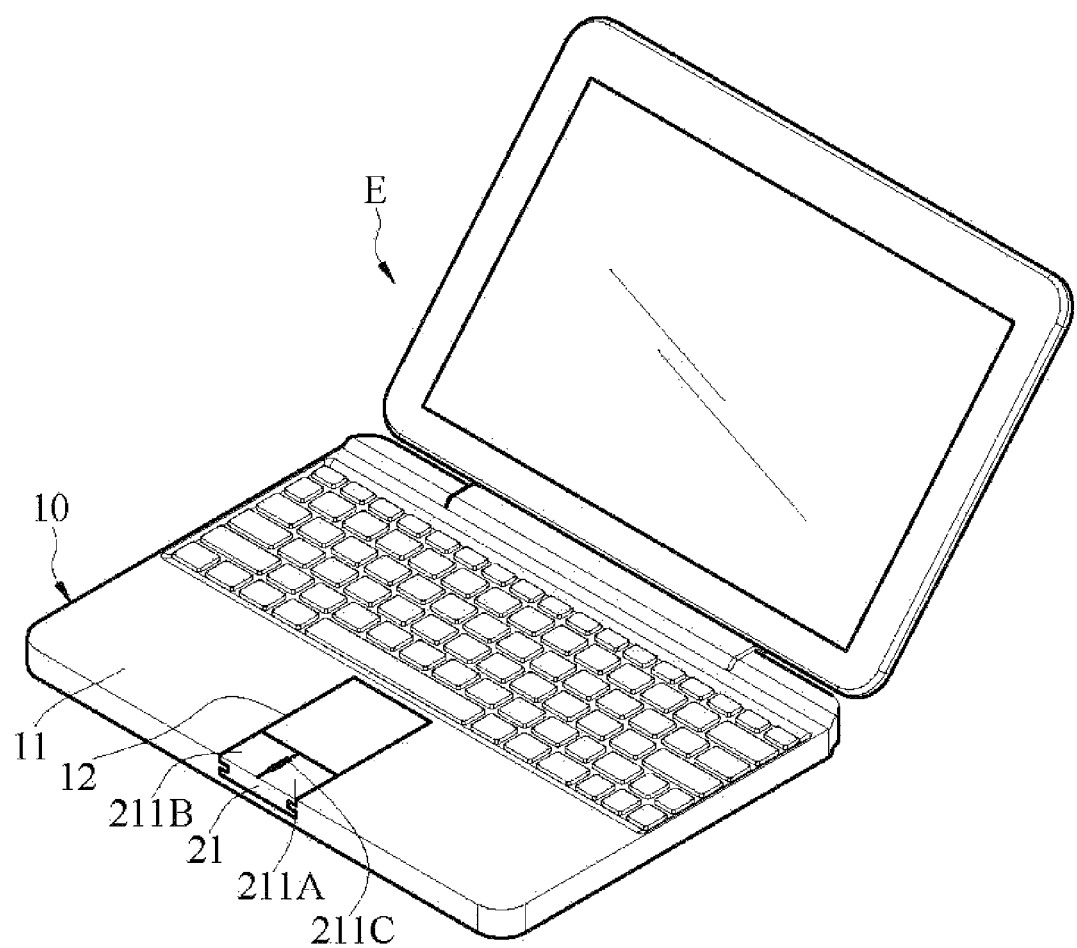
FIG. 4 is a schematic diagram showing another embodiment of the electronic device of the disclosure.
Figure 5:
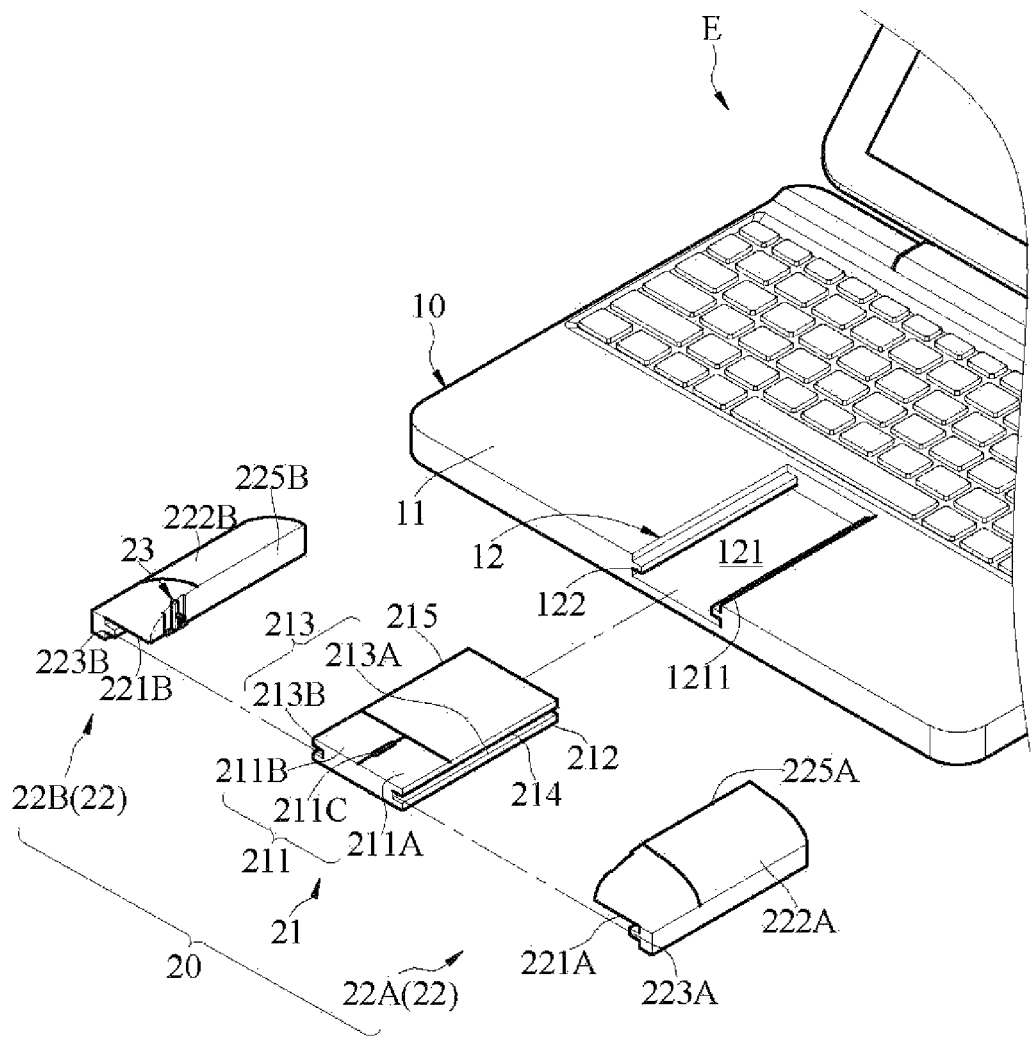
FIG. 5 is a schematic exploded view showing use of a mouse body in combination with an auxiliary member in another embodiment of the electronic device in FIG. 4.

In another embodiment, the auxiliary member 22 is not limited to a single structural member. Refer to FIG. 4 and FIG. 5. The auxiliary member 22 includes two parts. In an embodiment, the auxiliary member 22 includes a first auxiliary member 22A and a second auxiliary member 22B. Specifically, the first auxiliary member 22A and the second auxiliary member 22B are symmetrical generated by dividing the auxiliary member 22 in embodiments from FIG. 1 to FIG. 3. Further, the first engagement portion 223A is disposed in the first auxiliary member 22A and the second engagement portion 223B is disposed in the second auxiliary member 22B. Thereby, the first auxiliary member 22A and the second auxiliary member 22B are respectively disposed on two corresponding sides of the mouse body 21.

Refer to FIG. 4 and FIG. 5. In an embodiment, the touch surface 211 of the mouse body 21 includes a first control area 211A and a second control area 211B. The first control area 211A provides a left key function of the mouse body 21. The second control area 211B provides a right key function of the mouse body 21. The first auxiliary member 22A correspondingly presses the first control area 211A and the second auxiliary member 22B correspondingly presses the second control area 211B.

In addition, in another embodiment, at least one of a micro switch, an elastic feedback structure, or a cavity is disposed between the auxiliary member 22 and the touch surface 211 of the mouse body 21, so that the user can feel a feedback when pressing the auxiliary member 22, which is closer to experience of using a common mouse.

Figure 6:
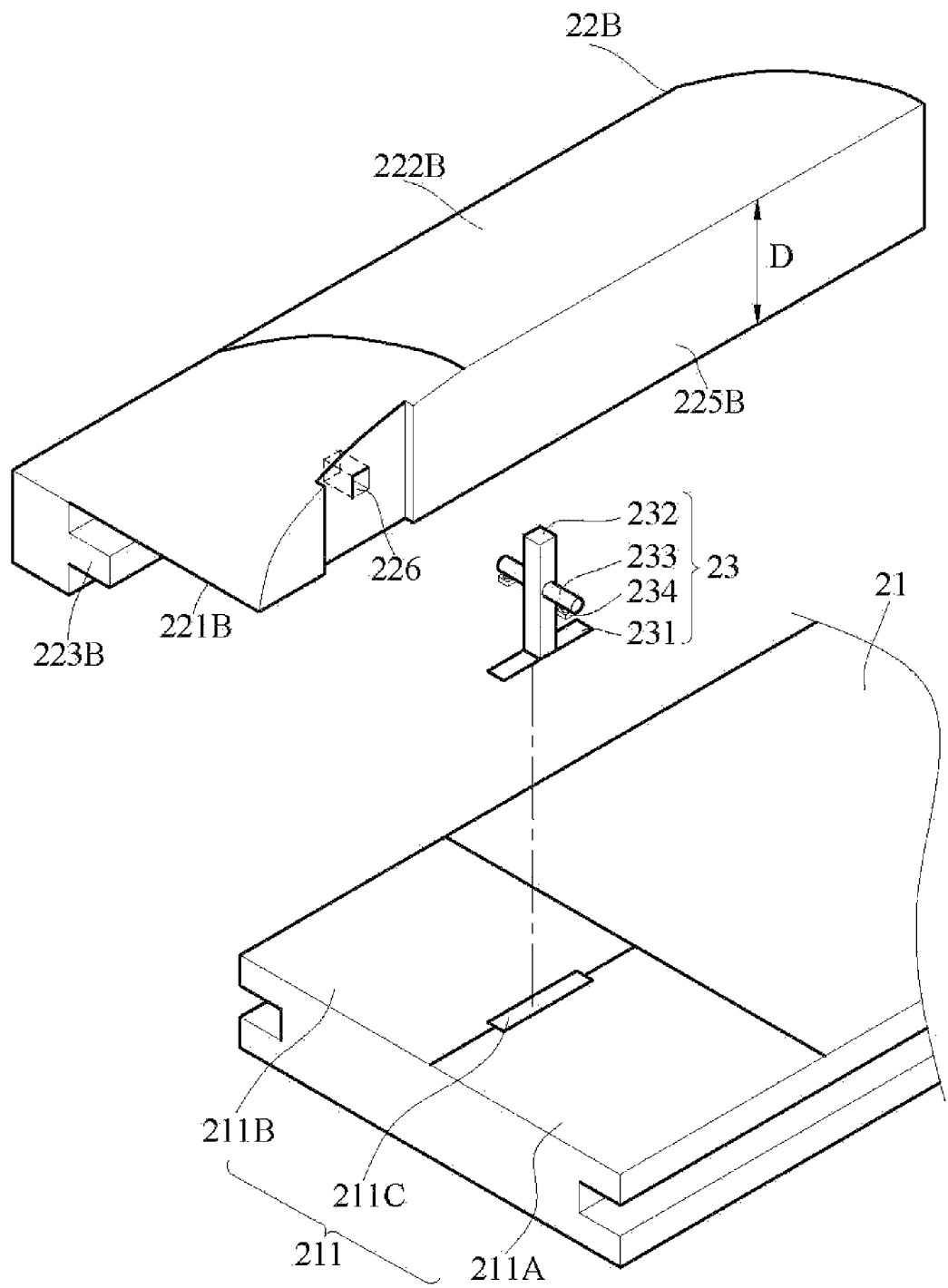
FIG. 6 is a schematic diagram showing a partial structure of FIG. 5.

Continue to refer to FIG. 5 in combination with FIG. 6. In an embodiment, the touch surface 211 further includes a third control area 211C. The third control area 211C provides a wheel function of the mouse body 21. The mouse 20 further includes a scroll control component 23. The scroll control component 23 includes a conductive part 231, a control body 232, a pressing part 233, and a reset part 234.

Refer to FIG. 5 and FIG. 6. In an embodiment, the scroll control component 23 is disposed between the first auxiliary member 22A and the second auxiliary member 22B and a location of the scroll control component 23 corresponds to a location of the third control area 211C. The conductive part 231 is disposed on an end of the control body 232. The other end of the control body 232 is slidably located between the first auxiliary member 22A and the second auxiliary member 22B for the user to slide or scroll. The pressing part 233 is disposed between the two ends of the control body 232. The reset part 234 is disposed adjacent to the pressing part 233. Specifically, the reset part 234 is disposed on a side, which is close to the conductive part 231, of the pressing part 233.

The scroll control component 23 is entirely assembled modularly in advance. Then, the scroll control component 23 is assembled on the auxiliary member 22 when the auxiliary member 22 is assembled on the mouse body 21. In an embodiment, the reset part 234 contacts the pressing part 233 and usually provides the pressing part 233 with elastic support power. Thereby, when a location of the reset part 234 is fixed, the control body 232 triggers the conductive part 231 and the pressing part 233 and presses the reset part 234 by using the pressing part 233 to generate elastic displacement. In some embodiments, the conductive part 231 is conductive fabric, the control body 232 is a slide bar or a wheel, the pressing part 233 is a solid structural member or a bearing, and the reset part 234 is a micro switch or a spring.

In an embodiment, both the pressing part 233 and the reset part 234 are disposed on two sides of the control body 232 of the scroll control component 23 respectively. Or, the pressing part 233 and the reset part 234 are disposed on only one side of the control body 232. The following is an example that the pressing part 233 and the reset part 234 are disposed on both two sides of the control body 232 for detail description.

Figure 7:
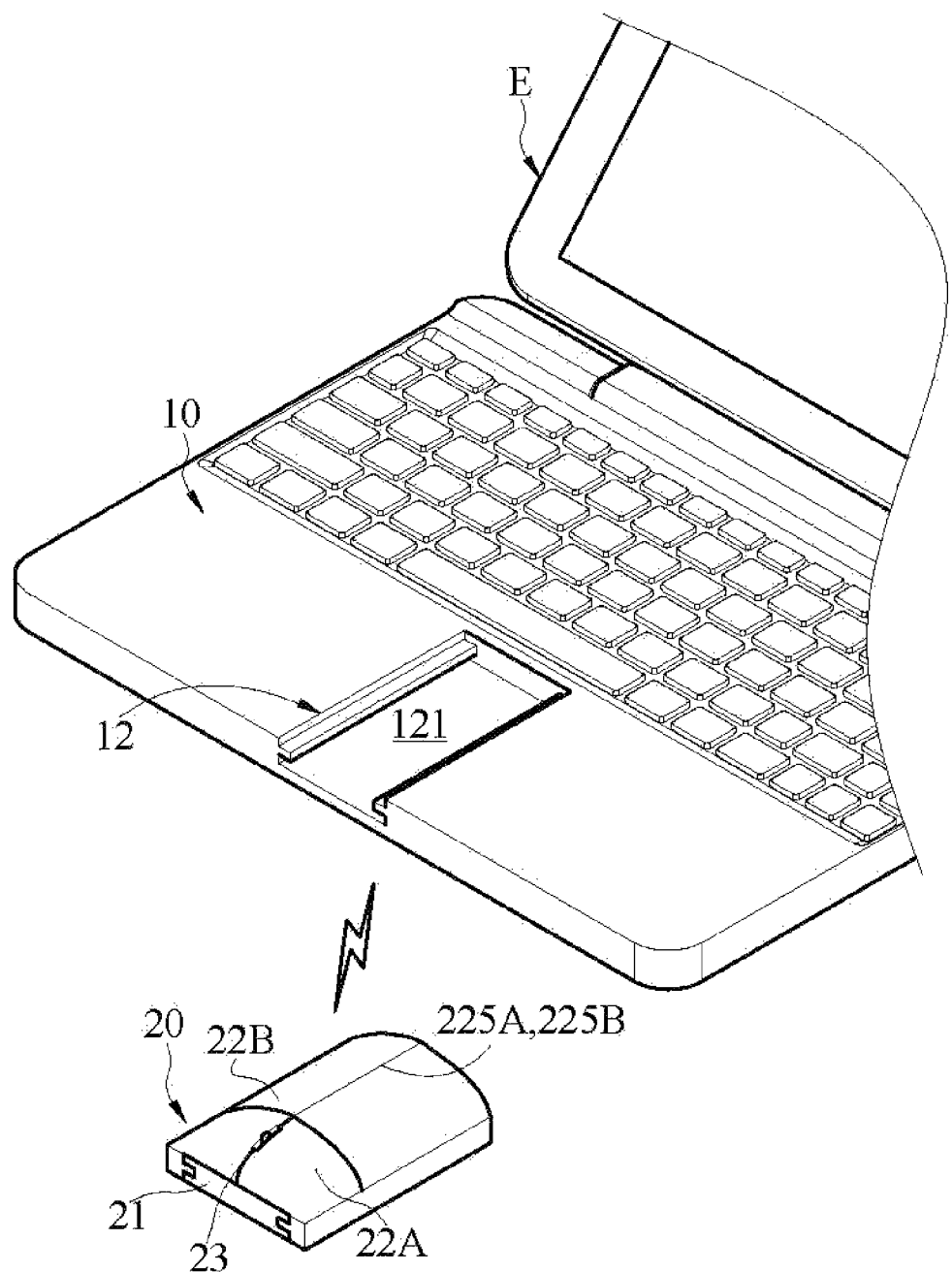
FIG. 7 is a schematic diagram showing a state in which a mouse component is detached from the body for use in another embodiment of the electronic device in the disclosure.

In an embodiment, refer to FIG. 5 to FIG. 7. The mouse 20 includes the scroll control component 23. The first auxiliary member 22A includes a first inner surface 221A, a first outer surface 222A, and a first side surface 225A. The first inner surface 221A is connected with an end of the first outer surface 222A. The first side surface 225A is connected with the first inner surface 221A and the other end of the first outer surface 222A. The first outer surface 222A is a curved surface. The second auxiliary member 22B has a second inner surface 221B, a second outer surface 222B, and a second side surface 225B. The second side surface 225B is connected with the second inner surface 221B and the other end of the second outer surface 222B. The second outer surface 222B is a curved surface. When the first auxiliary member 22A and the second auxiliary member 22B are combined with the mouse body 21, the first side surface 225A of the first auxiliary member 22A faces the second side surface 225B of the second auxiliary member 22B.

In an embodiment, refer to FIG. 6. A pressing slot 226 is provided for the first side surface 225A of the first auxiliary member 22A and the second side surface 225B of the second auxiliary member 22B, respectively. The pressing part 233 and the reset part 234 of the scroll control component 23 are accommodated in the pressing slot 226. The reset part 234 is located in the pressing slot 226. The pressing part 233 presses the reset part 234 in the pressing slot 226 to generate elastic displacement.

In an embodiment, a size of the pressing slot 226 is further set to limit the range of displacement of the control body 232. Specifically, when no force is imposed on the scroll control component 23, the reset part 234 is located on an end of the pressing slot 226 and the reset part 234 elastically support the pressing part 233, so that the pressing part 233 is usually pressed against the end of the pressing slot 226. In this way, when no force is imposed, the pressing part 233 of the scroll control component 23 is pressed against the end of the pressing slot 226 and supports the control body 232, so that the control body 232 and the conductive part 231 are far away from the touch surface 211 in this state. When the user wants to use the scroll control component 23 to execute a scroll control, presses the control body 232, and slides or scrolls at the same time, the control body 232 is imposed pressure to drive the conductive part 231 to contact the touch surface 211 of the mouse body 21 and slide on the touch surface 211 to generate a touch signal. By setting size of the pressing slot 226, the conductive part 231 exactly contacts with the touch surface 211 when the pressing part 233 presses the reset part 234 to an extreme location. Therefore, the user performs slide or scroll control when the control body 232 is pressed in place, to increase the usage convenience.

Figure 8:
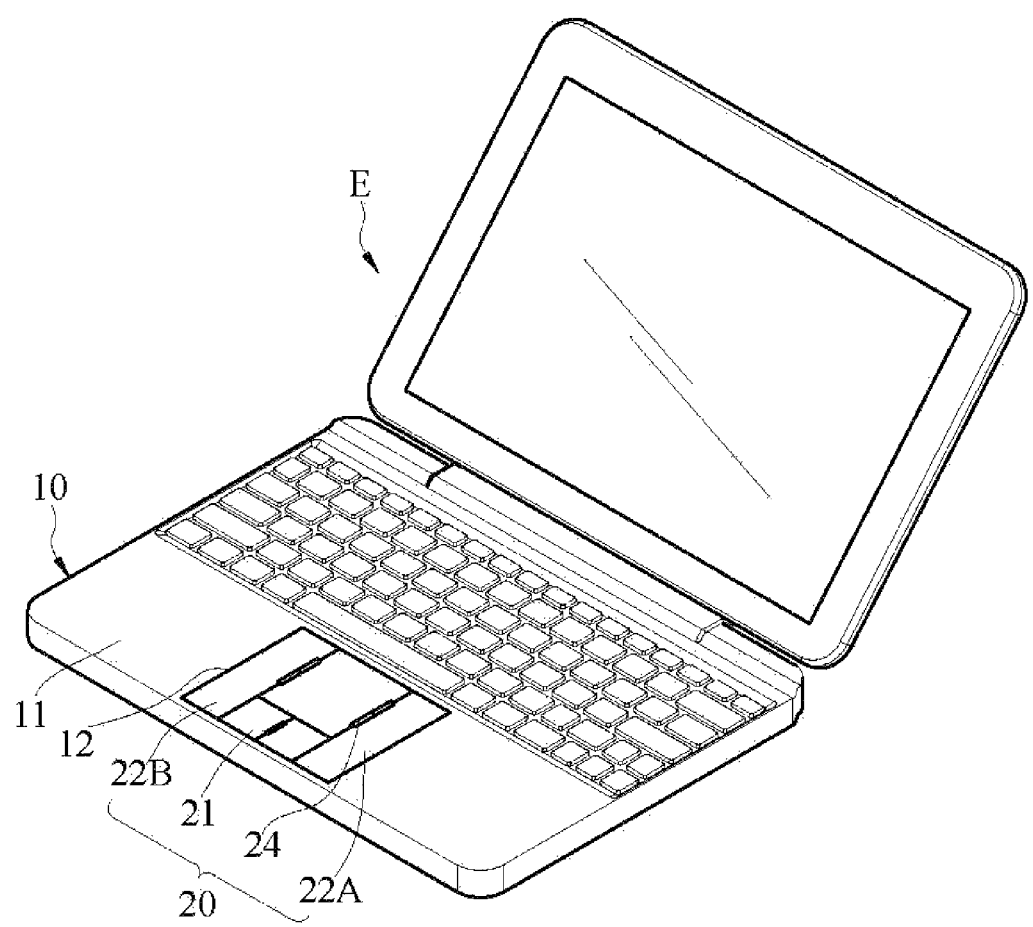
FIG. 8 is a schematic diagram showing a state in which a mouse is combined with the body for use in yet another embodiment of the electronic device in the disclosure.
Figure 9:
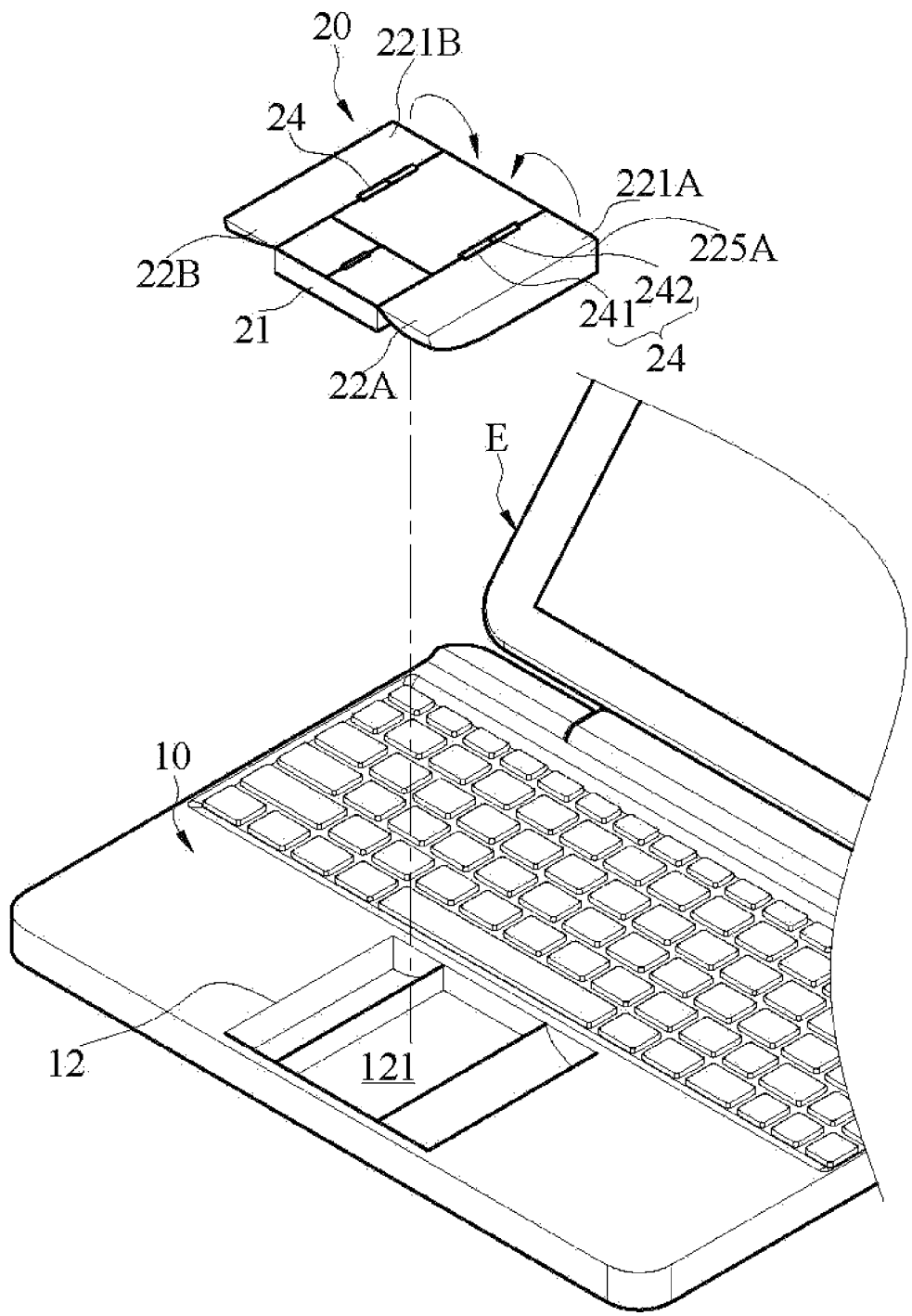
FIG. 9 is a schematic diagram showing a mouse detached from the body in yet another embodiment of the electronic device in the disclosure.
Figure 10:
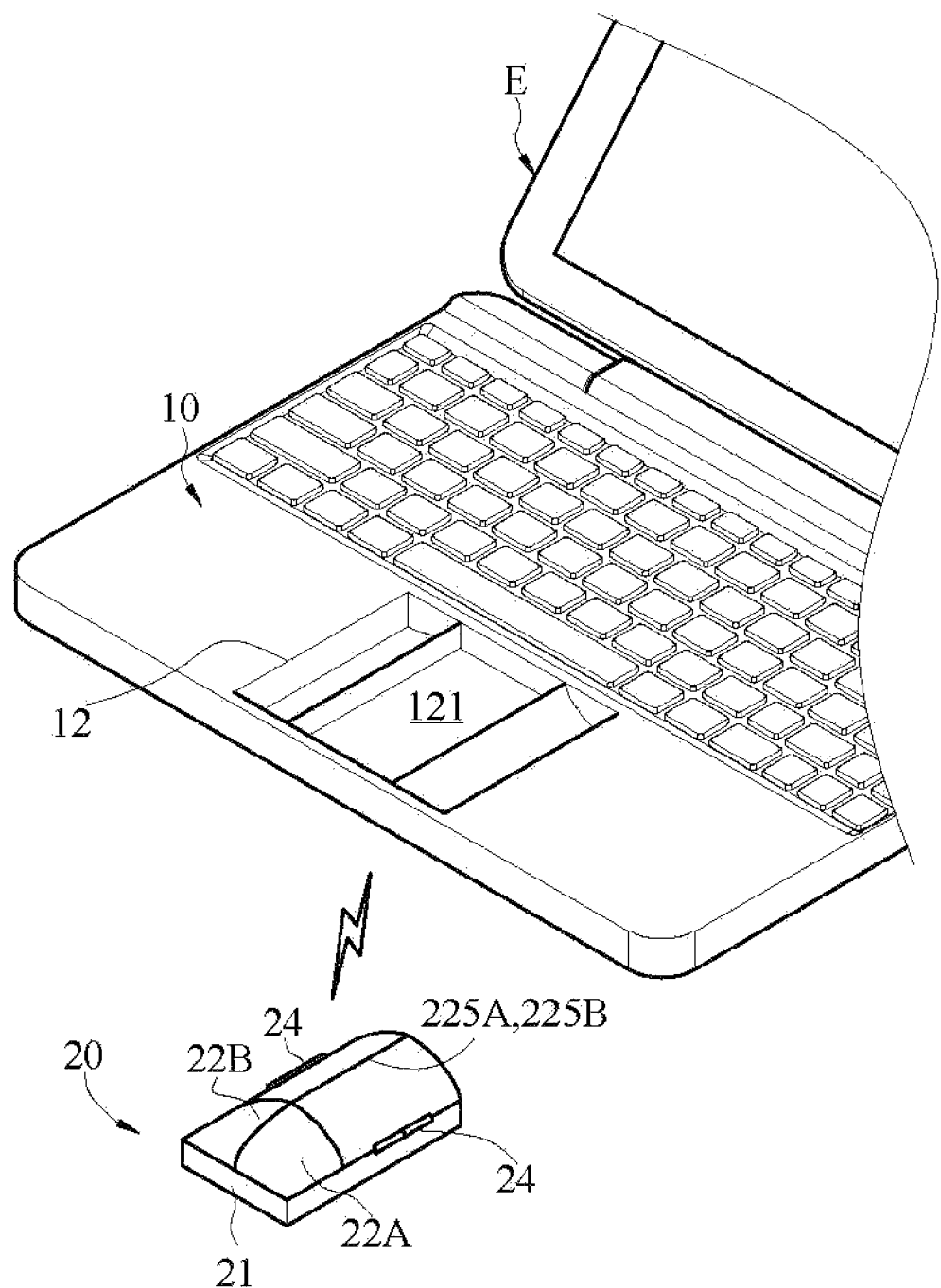
FIG. 10 is a schematic diagram showing a state in which a mouse is detached from the body for use in yet another embodiment of the electronic device in the disclosure.

Further, continue to refer to FIG. 8 to FIG. 10. In an embodiment, the inner surface 221 of the auxiliary member 22 is not superimposed on the touch surface 211 of the mouse body 21. When the inner surface 221 of the auxiliary member 22 is not superimposed on the touch surface 211 of the mouse body 21, the inner surface 221 of the auxiliary member 22 is located on a peripheral edge of the touch surface 211 and extends in a plane same as the touch surface 211. Specifically, the first auxiliary member 22A and the second auxiliary member 22B are pivotally connected to the mouse body 21 respectively by a pivoting structure 24. Further, the pivoting structure 24 includes a first shaft member 241 and a second shaft member 242. The second shaft member 242 is rotatably disposed through the first shaft member 241, and the first shaft member 241 and the second shaft member 242 are coaxial.

Continue to refer to FIG. 9. In the embodiment, a quantity of the pivoting structure 24 is two. The first shaft members 241 of each of the two pivoting structures 24 are fixedly disposed on two corresponding sides of the mouse body 21 respectively. The first inner surface 221A of the first auxiliary member 22A and the second inner surface 221B of the second auxiliary member 22B are fixedly connected with the second shaft members 242 of the pivoting structures 24 respectively.

In this way, the first auxiliary member 22A and the second auxiliary member 22B are pivoted to the mouse body 21, but not superimposed on the touch surface 211 of the mouse body 21, and the mouse 20 is disposed in the groove 121 of the accommodating area 12 of the body 10 in this state.

In an embodiment, the first inner surface 221A of the first auxiliary member 22A and the second inner surface 221B of the second auxiliary member 22B also have a touch sensing function. In this way, when the mouse 20 is accommodated in the groove 121, the first inner surface 221A and the second inner surface 221B are coplanar with the touch surface 211, but not superimposed on the touch surface 211, the first inner surface 221A of the first auxiliary member 22A and the second inner surface 22B of the second auxiliary member 22B become an extension of the touch surface 211 of the mouse body 21. Therefore, a touch area of the touch surface 211 is increased.

In an embodiment, a battery is further disposed in the mouse body 21 of the mouse 20, so that the mouse 20 provide power for itself to work independently when the mouse 20 is detached from the body 10.

In addition, in an embodiment, since the mouse 20 can work independently when it is detached from the body 10, a wireless communications unit is further disposed in the mouse body 21 of the mouse 20. The wireless communications unit is a Near Field Communication (NFC) or Bluetooth chip. In an embodiment, the wireless communications unit replaces a cable connecting a common mouse body and the body 10 for the mouse 20 to communicate with the body 10 of the electronic device E.

In an embodiment, when an NFC chip is disposed in the mouse body 21, an NFC chip is correspondingly disposed in the body 10 of the electronic device E and is raised for, so that wireless connection between the mouse body 21 and the body 10 is achieved by up-converting the frequency of the wireless communication chip to ensure that the mouse body 21 controls the body 10 even when it is detached from the electronic device E. Specifically, a 2.4 GHz unlicensed spectrum communication protocol is used as a wireless communication manner of the mouse body 21 when the mouse body 21 is detached from the body 10.

In addition, in an embodiment, to further improve comfort of using the mouse 20 when it is detached from the body 10, the mouse 20 further includes a counterweight block. Users can install different quantities of counterweight blocks in the mouse body 21 based on individual use habits or different requirements, so that the mouse body 21 is applicable for different users.

The above-described embodiments and/or implementations are merely illustrative of preferred embodiments and/or implementations for practicing the techniques of the disclosure, and are not intended to limit the embodiments of the techniques of the disclosure in any manner, and any person skilled in the art may make various variations or modifications to obtain other equivalent embodiments without departing from the scope of the technical means disclosed herein, and all such embodiments should still be considered to be substantially the same techniques or embodiments as the disclosure.

What is claimed is:

1. An electronic device, comprising:
a body, comprising an accommodating area;
a mouse body, comprising a touch surface and detachably disposed in the accommodating area;
two auxiliary members, each of the auxiliary members includes an inner surface and an outer surface opposite to each other and detachably configured to combine with the mouse body, a depth exists between the inner surface and the outer surface of the auxiliary member, the inner surface contacts the touch surface of the mouse body, the outer surface is for grasping and controlling the touch surface of the mouse body, wherein the inner surface of each of the auxiliary members has a touch sending function; and
two pivoting structures, each of the pivoting structures comprising a first shaft member and a second shaft member, the first shaft members of the two pivoting structures are respectively disposed at opposite sides of the mouse body, the second shaft members of the two pivoting structures are respectively disposed at the two auxiliary members, the second shaft member is rotatably disposed through the first shaft member, and the first shaft member and the second member are coaxial, when the two auxiliary members are not superimposed on the touch surface of the mouse body, the inner surfaces of the two auxiliary members extend in a plane same as the touch surface of the mouse body.

2. The electronic device according to claim 1, wherein an outer surface of the auxiliary member is a curved surface.

3. The electronic device according to claim 1, wherein a mouse is constituted when the auxiliary member is superimposed on the touch surface of the mouse body.

4. The electronic device according to claim 1, wherein the touch surface comprises a first control area and a second control area, and locations of the two auxiliary members respectively correspond to the first control area and the second control area.

5. The electronic device according to claim 4, wherein the touch surface further comprises a third control area, a scroll control component is further disposed between the two auxiliary members, and the scroll control component is elastically electrically connected to the third control area.

6. An electronic device, comprising:
a body, comprising an accommodating area;
a mouse body, comprising a touch surface, a first side and a second side opposite to each other, the first side and the second side are connected to the touch surface, the first side comprises a first sliding groove, the second side comprises a second sliding groove, and the mouse body is detachably disposed in the accommodating area; and
a first auxiliary member, includes a first inner surface and a first outer surface opposite to each other and detachably configured to combine with the mouse body, a depth exists between the first inner surface and the first outer surface of the first auxiliary member, the first inner surface contacts the touch surface of the mouse body, the first outer surface is for grasping and controlling the touch surface of the mouse body, wherein the first auxiliary member comprises a first bump, the first bump is slidably accommodated in the first sliding groove; and
a second auxiliary member, includes a second inner surface and a second outer surface opposite to each other and detachably configured to combine with the mouse body, a depth exists between the second inner surface and the second outer surface of the second auxiliary member, the second inner surface contacts the touch surface of the mouse body, the second outer surface is for grasping and controlling the touch surface of the mouse body, wherein the second auxiliary member comprises a second bump, the second bump is slidably accommodated in the second sliding groove.

7. An electronic device, comprising:
a body, comprising an accommodating area;
a mouse body, comprising a touch surface and detachably disposed in the accommodating area;
two auxiliary members, each of the auxiliary members includes an inner surface and an outer surface opposite to each other and detachably configured to combine with the mouse body, a depth exists between the inner surface and the outer surface of the auxiliary member, the inner surface contacts the touch surface of the mouse body, the outer surface is for grasping and controlling the touch surface of the mouse body, wherein the two auxiliary members are disposed at opposite sides of the mouse body; and
a scroll control component, comprising a conductive part, a control body, a pressing part and a reset part, the scroll control component is disposed between the two auxiliary members, the conductive part is disposed on an end of the control body, the other end of the control body is slidably located between the two auxiliary members, the pressing part is disposed between the two ends of the control body, the reset part is disposed adjacent to the pressing part.

* * * * *